United States Patent [19]
Hirschboeck

[11] 3,883,007
[45] May 13, 1975

[54] MATERIALS HANDLING APPARATUS

[75] Inventor: Stephen L. Hirschboeck, New London, Wis.

[73] Assignee: Upenders, Inc., New London, Wis.

[22] Filed: Oct. 3, 1973

[21] Appl. No.: 403,100

Related U.S. Application Data

[63] Continuation of Ser. No. 163,621, July 19, 1971, abandoned, Continuation-in-part of Ser. No. 16,676, March 5, 1970, abandoned.

[52] U.S. Cl. ............................ 214/1 Q; 214/130 C
[51] Int. Cl. ............................................. B65g 7/00
[58] Field of Search .......... 214/1 Q, 130 R, 130 C, 214/1 R, DIG. 4, 318, 312, 313, 314, 2.5, 514, 33 AD

[56] References Cited
UNITED STATES PATENTS

| | | | |
|---|---|---|---|
| 1,859,486 | 5/1932 | Aimes | 198/33 AD |
| 2,582,329 | 1/1952 | Harter, Jr. et al. | 214/2.5 X |
| 2,709,532 | 5/1955 | Marietta | 214/514 |
| 3,279,635 | 10/1966 | Avery et al. | 214/313 |
| 3,476,267 | 11/1969 | Clarue | 214/1 Q |

Primary Examiner—Frank E. Werner
Attorney, Agent, or Firm—Andrus, Sceales, Starke & Sawall

[57] ABSTRACT

The materials handling apparatus herein disclosed is adapted for orienting a load between horizontal and vertical positions and includes a load carrying member. The apparatus further includes a horizontal track and a vertical track disposed normal to each other. Means connected to one end of the load carrying member is adapted to be guided by the horizontal track. Means connected to the other end of the load carrying member is adapted to be guided by the vertical track. The apparatus also includes means for driving the load carrying member to provide the desired orientation for the load.

5 Claims, 13 Drawing Figures

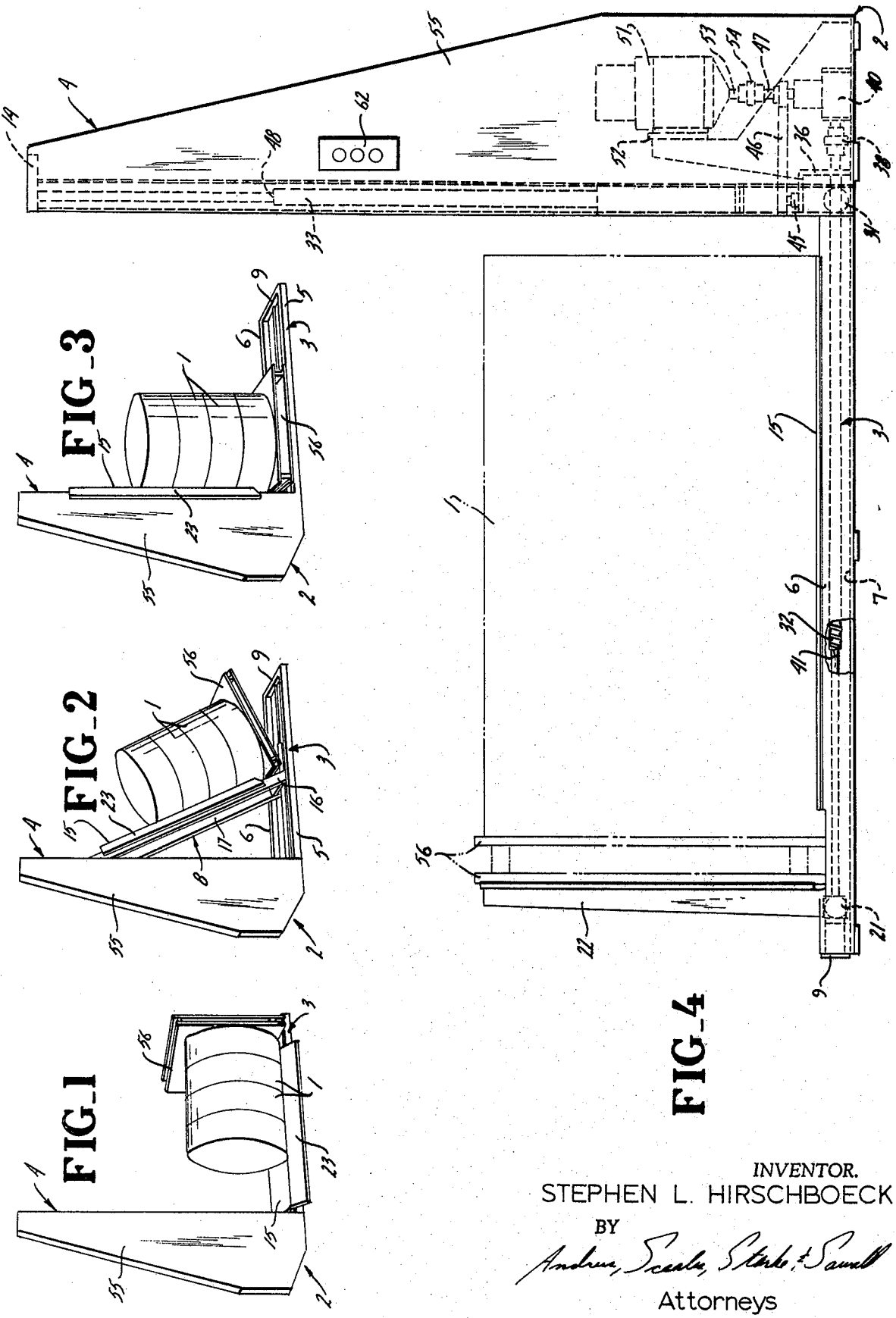

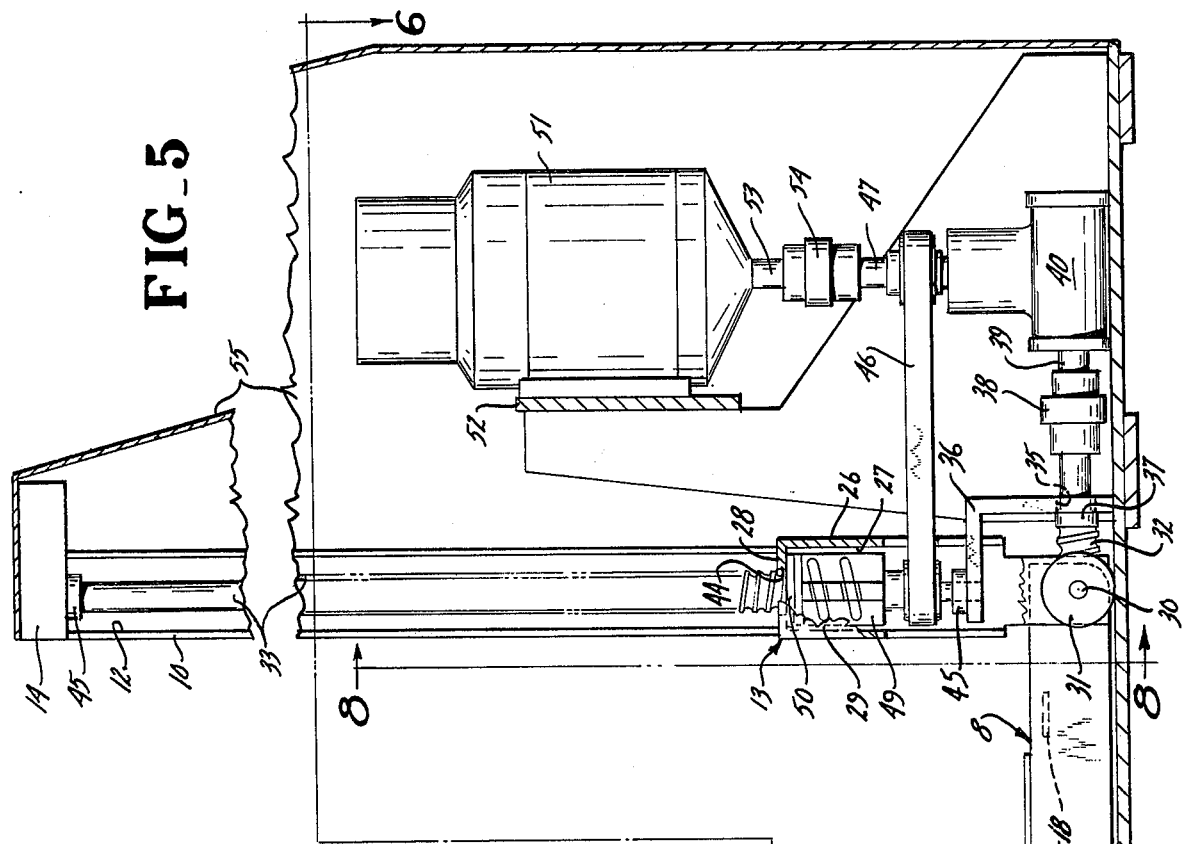
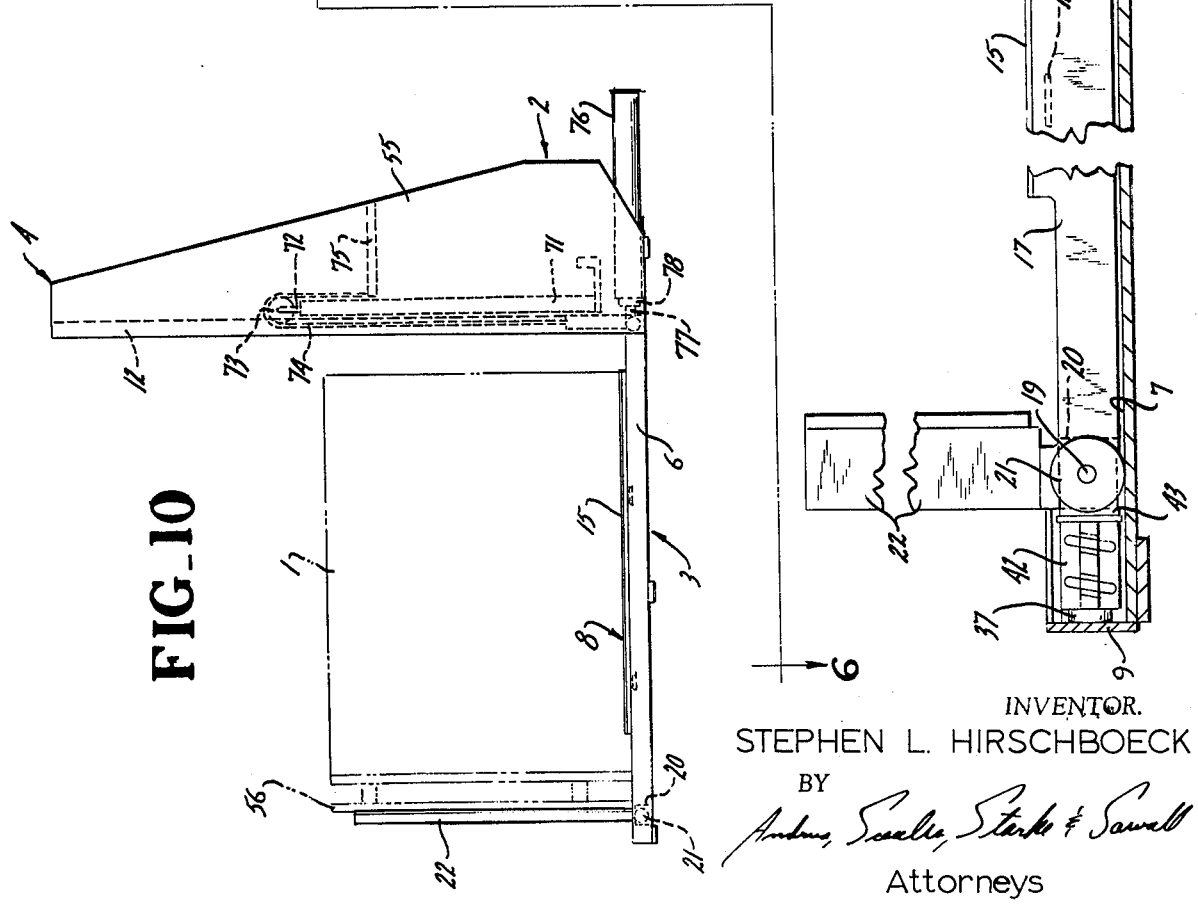

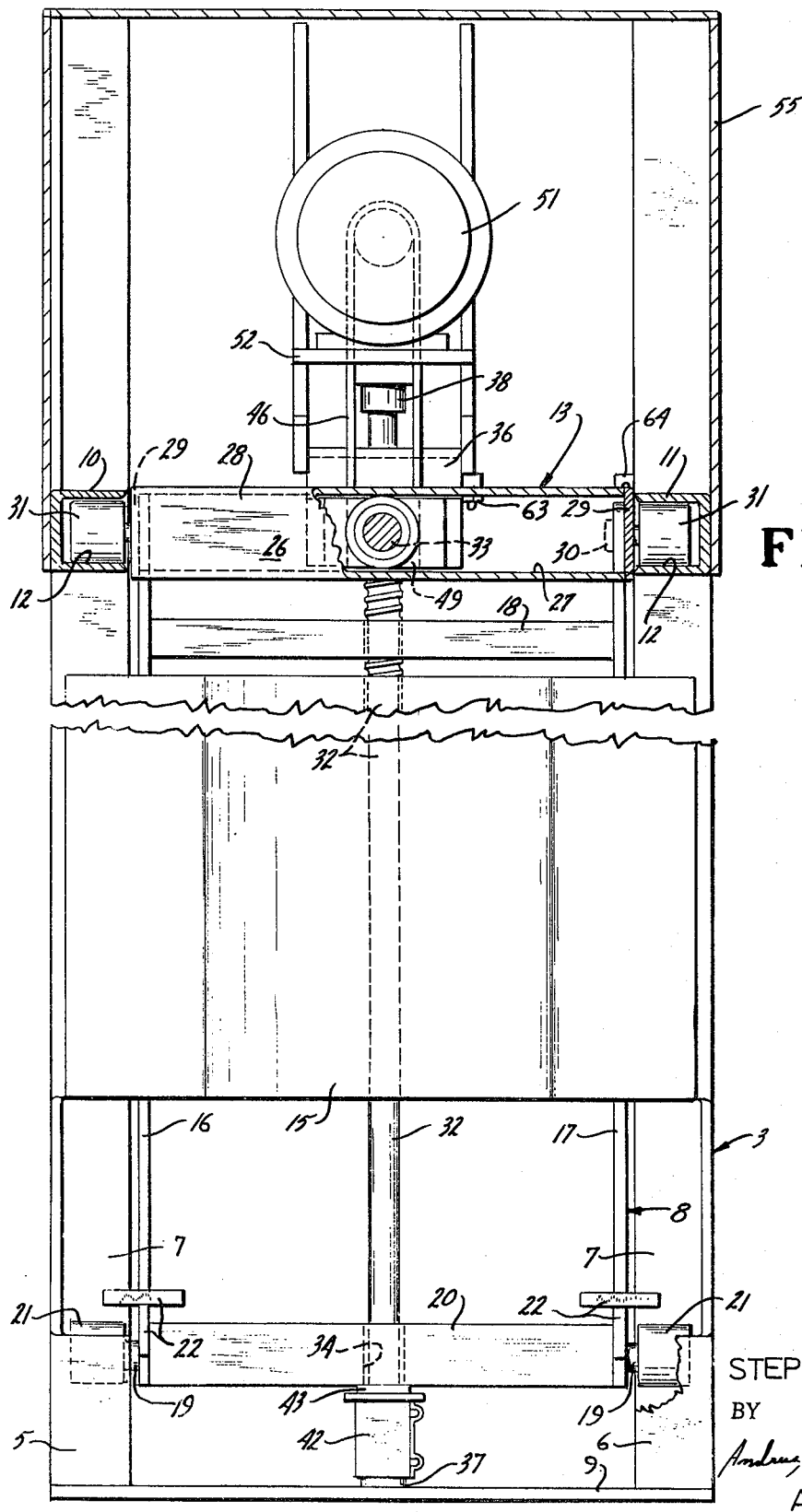
FIG_6

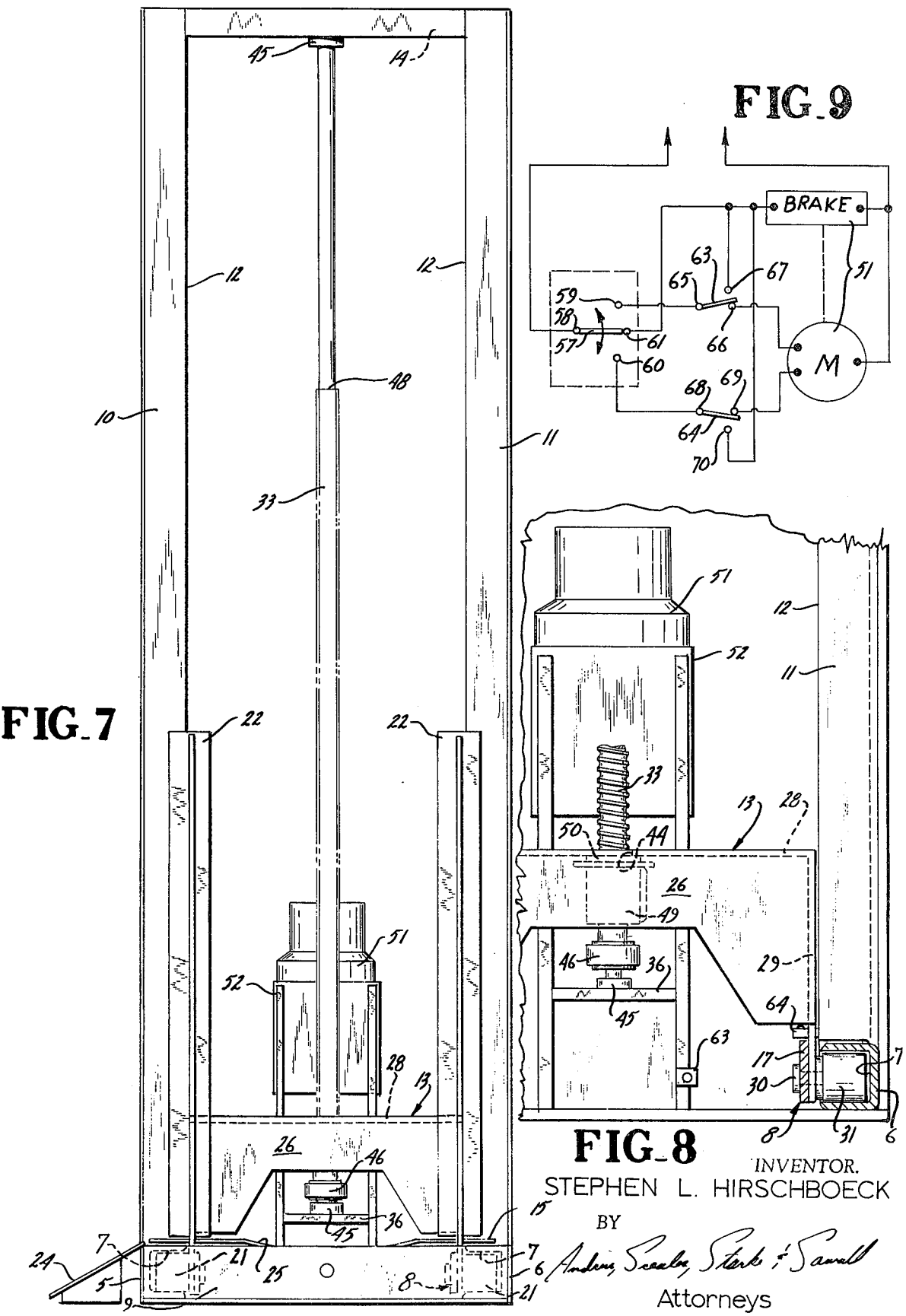

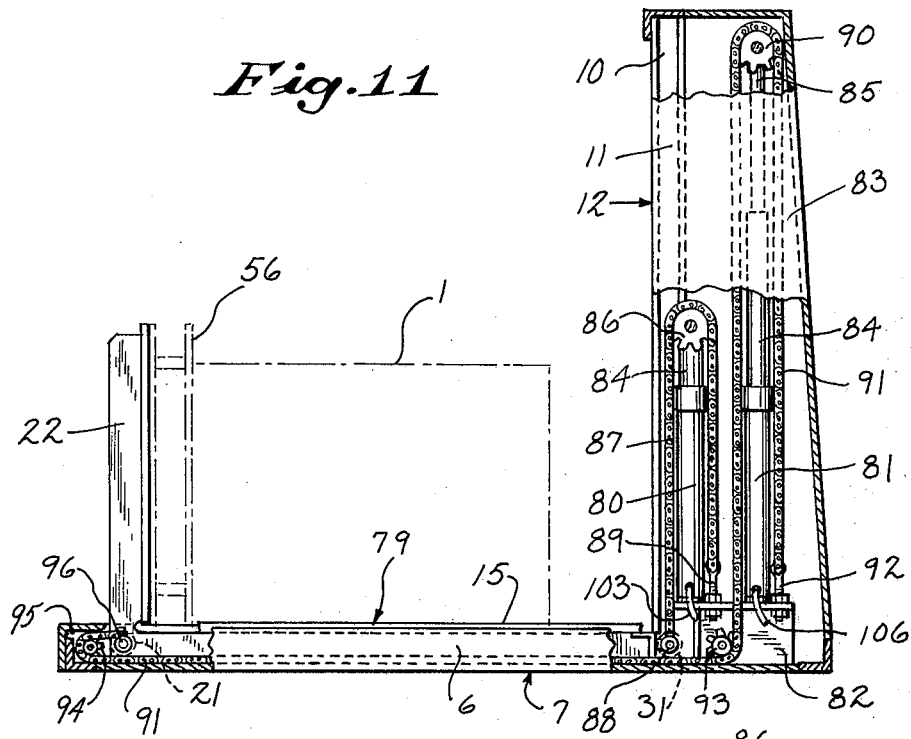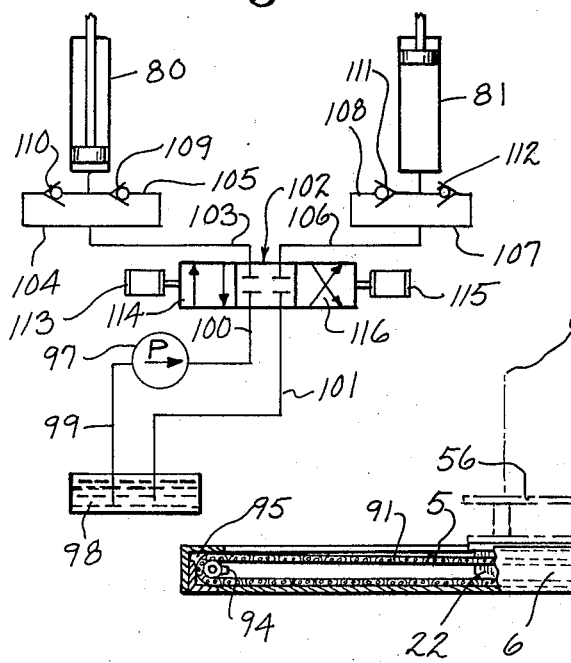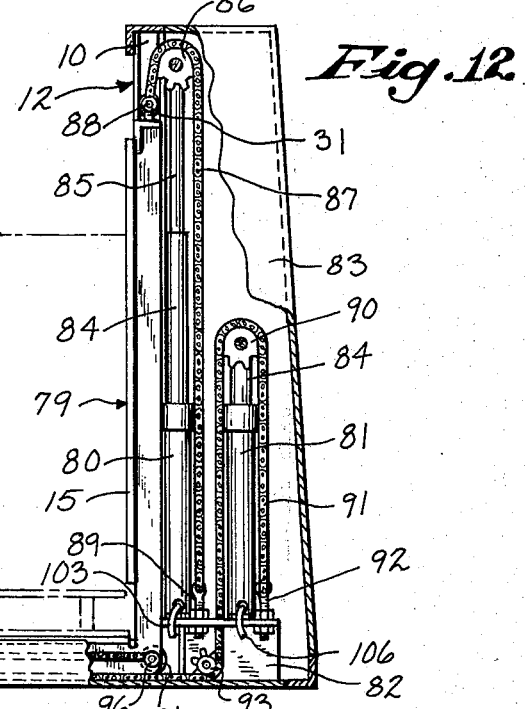

MATERIALS HANDLING APPARATUS

BACKGROUND OF THE INVENTION

This application is a continuation of applicant's copending application Ser. No. 163,621, filed July 19, 1971 which is in turn a continuation-in-part of applicant's then co-pending application Ser. No. 16,676 filed Mar. 5, 1970, both of the prior applications being entitled "Materials Handling Apparatus" and being now abandoned.

This invention relates to a materials handling apparatus and more particularly to apparatus for orienting a load between the horizontal and vertical positions.

Fork-lift trucks equipped with a roll clamp attachment are available to perform an upending operation providing for the movement of a load from the horizontal to the vertical position and a downending operation providing for the movement of a load from the vertical to the horizontal position. A suitable truck able to handle such an attachment, along with the attachment itself, represents a substantial investment which perhaps is warranted in the case of a large scale operation but is beyond the reach of many smaller operations. Because such a truck with roll clamp attachment requires utilization of a gripping pressure, there is always a possibility of damage for any material sensitive to pressure. Some materials are of course so sensitive to pressure that the use of a fork-lift truck with a roll clamp attachment is out of the question. Operation of such a truck and its attachment also requires considerable skill or the possibility of damage is further compounded. It is generally an object of this invention to provide apparatus for performing upending and downending operations which requires only a relatively modest investment, makes virtually no demands on skill, and does not resport to clamping pressures.

SUMMARY OF THE INVENTION

According to the invention, the materials handling apparatus includes a load carrying member operable between the horizontal and vertical positions to provide the desired orientation for the load. The apparatus further includes a horizontal track and vertical track disposed normal to each other. Means connected to one end of the load carrying member is adapted to be guided by the horizontal track. Means connected to the other end of the load carrying member is adapted to be guided by the vertical track. The apparatus further includes drive means for the load carrying member.

DESCRIPTION OF THE DRAWING FIGURES

The drawings furnished herewith illustrate the best mode for carrying out the invention as presently contemplated and set forth hereinafter.

In the drawings:

FIG. 1 is a perspective view of the materials handling apparatus of this invention prior to an upending operation or at the conclusion of a downending operation;

FIG. 2 is a perspective view of the apparatus with the load in an intermediate position either during an upending operation or a downending operation;

FIG. 3 is a perspective view of the apparatus prior to a downending operation or at the conclusion of an upending operation;

FIG. 4 is an enlarged side elevational view of the materials handling apparatus of this invention with parts broken away to better show certain details and in phantom lines shows a load of material thereon prior to an upending operation or at the conclusion of a downending operation;

FIG. 5 is an enlarged sectional elevation of the materials handling apparatus with parts broken away;

FIG. 6 is a view taken generally on line 6—6 of FIG. 5 and has parts broken away to better show certain details of the structure;

FIG. 7 is an end elevational view of the materials handling apparatus;

FIG. 8 is an enlarged partial detail section taken generally on line 8—8 of FIG. 5;

FIG. 9 is an electrical circuit diagram for showing the function of controlling the reversible brake-motor unit of the apparatus;

FIG. 10 is a side elevation of an apparatus according to this invention as adapted for hydraulic actuation;

FIG. 11 is a side elevation with parts broken away and sectioned and shows a further embodiment of the invention and in phantom lines shows a load prior to an upending operation or at the conclusion of a downending operation;

FIG. 12 is a view generally similar to that of FIG. 11 and shows the same mechanism after an upending operation or prior to a downending operation with the load being illustrated in phantom lines; and FIG. 13 is a diagrammatic view of the hydraulic system as may be employed for the embodiment of FIGS. 11 and 12.

DESCRIPTION OF THE ILLUSTRATED EMBODIMENTS

The materials handling apparatus of this invention is adapted for orienting material between the horizontal and vertical positions. While the apparatus has wide industrial application, it is here described as it might be employed for orienting a load comprising a plurality of rolls of paper 1 initially arranged side by side with their axes generally aligned horizontally to a stacked position wherein the axes of the rolls 1 are disposed vertically as generally shown in FIGS. 1–3.

Referring to the drawings, the materials handling apparatus of this invention comprises a generally L-shaped frame structure 2 having a horizontal leg 3 and a vertical leg 4. The horizontal leg 3 of the frame structure 2 includes a pair of transversely spaced, generally parallel channel members 5 and 6 having inwardly facing channel recesses and being adapted to form the opposed rails for generally horizontal track 7 for movably supporting one end of a cradle assembly 8. The rearward or free end of track 7 opposite from the vertical leg 4 terminates with an end plate 9 welded or otherwise secured to the spaced channel members 5 and 6.

The vertical leg 4 of the frame structure 2 includes a pair of transversely spaced, generally parallel channel members 10 and 11 disposed generally in the vertical plane of channel members 5 and 6. Channel members 10 and 11 have their channel recesses facing inwardly and are adapted to form the opposed rails for a generally vertical track 12 for a vertically movable carriage assembly 13. An end plate 14 is welded or otherwise secured between the spaced channel members 10 and 11 at the upper end of the vertical leg 4.

The cradle assembly 8 is movable between horizontal and vertical positions as generally shown in FIGS. 1–3 and, with particular reference to FIGS. 4–6 showing the assembly 8 in the horizontal position, comprises the cradle plate 15 which extends between and over the spaced channel members 5 and 6. The cradle plate 15 for supporting the materials to be oriented is carried by suitable framing means including a pair of longitudinally extending, transversely spaced framing members 16 and 17 disposed inwardly of the corresponding channel members 5 and 6 and connected by a plurality of cross braces 18. The framing members 16 and 17 extend longitudinally beyond the ends of the cradle plate 15 and the rearward ends of the framing members adjacent to end plate 14 are pivotally supported by carriage means including axially aligned stub shafts 19 projecting from the opposite ends of the rectangular section cross member 20. Outwardly of framing members 16 and 17 the respective stub shafts 19 mount the rollers 21 rotatably disposed in the opposed recesses of channel members 5 and 6 forming the horizontal track 7.

The cradle assembly 8 further includes a pair of transversely spaced and aligned T-section arms 22 which extend generally perpendicularly from the framing members 16 and 17 adjacent to the ends thereof. As shown in FIGS. 4–6 with the cradle assembly 8 in the horizontal position, the arms 22 extend generally vertically above the rollers 21 and generally parallel to the vertical leg 4 of the frame structure 2.

For greater ease of handling relatively heavy rolls 1, the cradle plate 15 may be provided with an inclined skirt or ramp 23 on either or both sides of the plate. As shown in FIG. 1, the skirt 23 is formed integrally with the plate 15 and extends generally to the floor outwardly of track 7 when the cradle assembly 8 is in the horizontal position. Alternatively, a separate ramp 24, as shown in FIG. 7, may be placed along the longitudinal edges of an unskirted cradle plate 15 to make it easier to roll the rolls 1 onto the plate. A further alternative for ease of materials handling, not shown, would be to place the apparatus of this invention into a floor recess to the depth of an unskirted cradle plate 15 and so eliminate the need for the integral skirt 23 or separate ramp 24. For more secure retention of the rolls 1 on the cradle plate 15, the plate may be transversely dished as perhaps best shown in FIG. 7 at 25.

As shown in FIGS. 7 and 8, the vertically movable carriage assembly 13 includes a U-shaped member 26 disposed between the vertical channel members 10 and 11. Member 26 generally comprises an inverted channel section member having a recess 27 beneath the cover plate 28 as generally shown in FIG. 5. The transverse ends of member 26 are closed by vertically disposed end plates 29 which project downwardly beneath the legs of the member. Beneath the legs of the U-shaped member 26, the end plates 29 carry transversely extending and aligned shafts 30 for mounting the rollers 31 rotatably disposed in the opposed recesses of channel members 10 and 11 forming the vertical track 12. The forward ends of the cradle assembly framing members 16 and 17 are pivotally disposed on the corresponding carriage assembly shafts 30 to movably support the corresponding end of the cradle assembly 15.

The cradle assembly 8 is driven between the horizontal and vertical positions by a pair of synchronously driven ball bearing screw shafts 32 and 33 disposed generally at right angles to each other in a common vertical plane.

The horizontal ball bearing screw shaft 32 is disposed beneath the cradle plate 15 and the several framing cross braces 18 generally midway between the channel members 5 and 6. The shaft 32 extends through the axially aligned openings 34 and 35 in the cradle assembly cross member 20 and in the vertical portion of the angle bracket 36 mounted on the frame structure 2 forwardly of the vertical leg 4. The shaft 32 is rotatably supported by a pair of suitable thrust bearings 37 respectively mounted on the frame end plate 9 and the angle bracket 36 and is drivingly connected by coupling member 38 to the projecting shaft 39 from the gear box 40 disposed on the frame structure 2 forwardly of the angle bracket. A forward portion of shaft 32 extending from an intermediate position at 41 generally to the bearing 37 on angle bracket 36 is provided with a concave helical groove characteristic of ball bearing screw shafts. The portion of shafts 32 rearwardly from the position at 41 is plain or devoid of the helical groove and has a diameter corresponding generally to that for the base of the groove for reasons to be explained hereinafter.

A ball bearing nut 42 is disposed on the shaft 32 and is mounted rearwardly on the cradle assembly cross member 20 coaxially aligned with the opening 34. The nut 42 is freely movable on the rear plain portion of shaft 32 and is engageable with the forward helical groove portion of the shaft to drive the cradle assembly 8 in a manner further described hereinafter. A resilient cushion element 43 is interposed between the nut 42 and the cross member 20 to provide a limited degree of flexibility therebetween to assure a generally smooth and proper engagement of the nut on the helical screw of shaft 32 at 41 and to cushion any shock resulting from the engagement.

The vertical ball bearing screw shaft 33 is disposed generally midway between channel members 10 and 11 and extends through the opening 44 of the cover plate 28 for the carriage assembly member 26 and generally between the frame upper end plate 14 and the horizontal portion of the angle bracket 36 disposed above the horizontal shaft 32. The shaft 33 is rotatably supported between suitable thrust bearings 45 respectively mounted on upper end plate 14 and angle bracket 36 and is driven at the same speed or synchronously with shaft 32 by the timing belt or chain drive 46 from the input shaft 47 for the gear box 40. A lower portion of shaft 33 extending from an intermediate position at 48 downwardly to the chain or belt drive 46 has a concave helical groove of identical diametrical dimensions as the grooved portion of shaft 32. Upwardly from the position at 48 the shaft 33 is plain or devoid of the helical groove and has a diameter corresponding to the base of the groove generally like the rear portion of shaft 32.

The carriage assembly 13 carries the ball bearing nut 49 which is disposed on the vertical shaft 33. The nut 49 is mounted to the underside of carriage assembly cover plate 28 in the channel recess 27 of member 26 and is coaxially aligned with the opening 44. A resilient cushion element 50 is disposed between the nut 49 and cover plate 28 to provide limited flexibility therebetween providing for generally smooth engagement of the nut onto the helical screw portion of shaft 33 and to cushion any shock resulting from the engagement.

The synchronous operation of the shafts 32 and 33 is provided through the reversible brake-motor 51 mounted on a suitable support bracked 52 of the frame structure 2. The motor shaft 53 is connected to the input shaft 47 of the gear box 40 by a suitable coupling element 54. A suitable casing 55 may enclose the brake-motor 51 and gear box 40 forwardly of the vertical leg 4.

When the cradle assembly 8 is to be loaded for an upending operation or load orientation from the horizontal to the vertical position, a pallet 56 is ordinarily placed on edge immediately adjacent the arms 22 and the load member, such as the rolls 1, are placed side by side on the cradle plate 15 from the pallet forwardly with their axes generally aligned horizontally. With the load arranged in this manner in the horizontal position, the load will be in a stacked condition on the pallet 56 subsequent to upending as generally shown in FIG. 3, and the stacked palletized load may be moved to storage or to the next operation by engagement of a conventional fork-lift truck under the pallet. Conversely, when a stacked load is to be downended or oriented from the vertical to the horizontal position, the stacked palletized load is placed on the horizontally extending arms 22 of the vertically disposed cradle assembly 8 by a fork-lift truck. Subsequent to downending to place the cradle assembly 8 in the horizontal position, the rolls 1 will be disposed side by side with the pallet 56 on edge adjacent to the vertically extending arms 22.

FIG. 9 represents a simplified electrical circuit diagram intended primarily to show the function of controlling the reversible brake-motor 51, a suitable three phase, A.C. motor having a suitable mechanical or electrical braking system. In the diagram of FIG. 9, a single pole, three-position switch 57 is shown for selective control of the brake-motor 51. When the switch 57 is selectively actuated to close across the upending contacts 58 and 59, the motor circuit is energized to rotatably drive the shafts 32 and 33 correspondingly to provide for the upending of the cradle assembly 8. When the switch 57 is selectively actuated to close across the downending contacts 58 and 60, a parallel motor circuit is energized to rotatably drive the shafts 32 and 33 correspondingly to provide for the downending of the cradle assembly 8. Selective actuation of switch 57 to close across the braking contacts 58 and 61 renders the braking circuit effective to stop the motor. As a matter of practical application, however, a multiple switch unit 62 having three separate control buttons could be used for control of the brake-motor 51 as generally shown in FIG. 4.

In the parallel motor circuits of FIG. 9 providing for the upending operation and the downending operation respectively, corresponding two-position limit switches 63 and 64 are provided. Limit switch 63 is normally closed across contacts 65 and 66 to render the upending motor circuit energizable. The switch 63 is mounted on the frame structure 2 and is engageable by the cross member 20 as the cradle assembly 8 approaches the generally vertical upending position. Upon engagement by cross member 20 at the conclusion of the upending operation, the switch 63 is actuated to open the upending motor circuit and to close across the switch contacts 65 and 67 to render the braking system effective to stop the motor.

The limit switch 64 is normally closed across the contacts 68 and 69 to render the downending motor circuit energizable. Switch 65 is mounted on the frame structure 2 and is engageable by member 26 of the carriage assembly 13 when the cradle assembly 8 approaches its horizontal position. When the member 26 engages the switch 64 at the conclusion of the downending operation, the switch is actuated to open the downending motor circuit and to close across the contacts 68 and 70 to effect a braking of the motor.

To effect an upending operation or an orientation of the cradle assembly 8 from the horizontal to a vertical position, the upending motor circuit is energized to synchronously drive the shafts 32 and 33 correspondingly. With rotation of shaft 33 to effect upending, the ball bearing nut 49 is driven upwardly on shaft 33 and carries the carriage assembly 13 as guided by the track 12 correspondingly to lift the forward end of the cradle assembly 8. During the initial upward movement of the forward end of the cradle assembly 8, the rear end of the assembly 8 simply moves forwardly as guided by the horizontal track 7 and the ball bearing nut 42 freely moves or slides along the plain rear portion of shaft 32 devoid of the helical ball bearing screw. As the upending operation continues and the cradle assembly 8 nears the intermediate position defining a 45° angle, the ball nut 42 passes the location at 41 on shaft 32 and engages with the helical ball bearing screw portion of that shaft. When the cradle assembly 8 is disposed at substantially 45°, both ball nuts 42 and 49 are momentarily engaged with the helical ball bearing screw portions of their respective shafts 32 and 33. The overlapping or double engagement by both ball nuts 42 and 49 on the helical ball bearing screw portions of their respective shafts 32 and 33 is maintained for approximately one inch of travel of the nuts along their respective shafts following which the nut 49 reaches the end of the helical screw portion at 48 on shaft 33. Thereafter the ball nut 49 freely moves or slides along the plain upper portion of shaft 33 devoid of the helical ball bearing screw while the ball nut 42 continues to be driven forwardly by the shaft 32 until the cradle assembly 8 reaches the vertical position.

For downending operation to orient the cradle assembly 8 from the vertical to the horizontal position, the operation is generally the converse from upending. Upon energization of the downending motor circuit, the shafts 32 and 33 are correspondingly driven. The ball nut 42 engaged on the helical ball bearing screw portion of shaft 33 is driven rearwardly and carries the corresponding end of the cradle assembly 8 with it as guided along the horizontal track 7. During the initial downending movement of the cradle assembly 8, the ball nut 49 freely moves or slides downwardly on the plain upper portion of shaft 33 devoid of the helical ball bearing screw and the carriage assembly 13 moves corresondingly as guided by track 12. As the cradle assembly 8 nears the 45° angle position, the ball nut 49 passes the location at 48 on shaft 33 and makes engagement with the helical screw portion of that shaft. After the ball nut 49 makes engagement with the helical screw portion of shaft 33, there is momentarily overlapping or double engagement by both nuts 42 and 49 with the helical screw portion of their respective shafts 32 and 33 for approximately 1 inch of travel along the shafts. Thereafter the ball nut 42 leaves the helical screw portion of shaft 32 at 41 and is free to move or slide along the plain rear portion of that shaft while the ball nut 49 continues to be driven downwardly by the shaft 33 until the cradle assembly 8 reaches the horizontal position.

Turning now to the embodiment of FIG. 10, a system for hydraulic actuation of the cradle assembly 8 of the materials handling apparatus has replaced the ball bearing screw drive hereinbefore described. In FIG. 10, the cradle assembly 8 is guided by a horizontal track 7 and vertical track 12 provided in the generally similar L-shaped frame structure 2 as hereinbefore described. A vertically disposed hydraulic cylinder-piston assembly 71 is mounted on the frame structure 2 forwardly of the track 12 and is adapted to raise and lower the forward end of the cradle assembly 8. The projecting piston rod 72 of the assembly 71 extends upwardly and pivotally carries the pulley 73 at the upper end thereof. A taut length of flexible wire rope or chain 74 has one end thereof anchored to the carriage assembly 13 and extends upwardly over the pulley 73. The opposite end of the rope or chain 74 is anchored to the frame projection 75 disposed somewhat beneath the pulley 73. Upon extension of the cylinder-piston 71 by a source of hydraulic pressure, not shown, to effect upending, the rope or chain 74 rides over the pulley 73 to lift the carriage assembly 13 along with the forward end of the cradle assembly 8 as guided by the track 12. Conversely, upon contraction of the assembly 71 to effect downending, the carriage assembly 13 and forward end of the cradle assembly 8 are lowered.

In the upending operation, an intermediate position of the cradle assembly 8 is reached wherein the center of gravity of the load on plate 15 will shift from a position forwardly of the track rollers 21 to a position to the rear of the rollers which is likely to cause the cradle assembly to overrun the lifting effort of the cylinder-piston assembly 71 and complete the upending operation in an uncontrolled and possible violent manner likely to result in damage to the load and/or the materials handling apparatus. To preclude such an overrunning by the cradle assembly 8, a horizontally disposed cylinder-piston assembly 76 is mounted on the frame structure 2 forwardly of track 12 and is extended by a source of hydraulic pressure, not shown, during the upending operation. To provide the desired length of extension, the cylinder-piston assembly 76 may include a pair of telescoping pistons, not shown, having corresponding rods 77 and 78 projecting from the assembly beneath the cradle plate 15. The extended telescoping rods 77 and 78 of the cylinder-piston assembly 76 are engaged by the cross member 20 of the cradle assembly 8 during upending, and following such engagement the cylinder-piston assembly 76 is contracted in a desired manner to provide for controlled travel by the cradle assembly over the remaining portion of the upending operation.

The horizontal cylinder-piston assembly 76 is also required to initiate the downending operation in the embodiment of FIG. 10. Upon extension of the cylinder-piston assembly 76, the cross member 20 is caused to move rearwardly with the cradle assembly 8 moving correspondingly. Simultaneously the cylinder-piston assembly 71 is being contracted. As the center of gravity of the load on the cradle assembly 8 shifts from a position rearwardly of rollers 21 to a position forwardly of the rollers, the contracting cylinders-piston assembly 71 takes over to provide for controlled travel by the cradle assembly over the remaining portion of the downending operation.

In the embodiment of FIGS. 11 through 13 hydraulic actuation is also relied upon for upending and downending operation of the cradle assembly 79. A pair of single acting two stage, hydraulic ram means or cylinder-piston assemblies 80 and 81 are mounted on the frame element 82 forwardly of the vertical track 12 and are enclosed by a suitable casing 83. The assemblies 80 and 81 have tandem rams or pistons to extend the telescoping rods 84 and 85 of each assembly over the desired stroke.

The inner rod 85 of the cylinder-piston assembly 80 carries a rotatable sprocket 86 on the end thereof which is meshingly engaged by the roller chain 87. The length of roller chain 87 extends over the sprocket 86 and the rearward vertical reach thereof is pivotally connected to an anchor bolt or the like 88 carried at the forward end of the cradle assembly 79 generally transversely aligned with the rollers 31 movable in the vertical track 12. The forward reach or opposite end of the roller chain 87 is connected to the anchor bolt 89 secured to the frame element 82.

The inner rod 85 of the cylinder-piston assembly 81 carries a rotatable sprocket 90 on the end thereof. A length of roller chain 91 extends meshingly over the sprocket 90 and has a forward vertical reach connected to anchor bolt 92 secured to the frame element 82. On the opposite or rearward side of sprocket 90, the roller chain 91 extends downwardly and meshingly engages beneath the sprocket 93 rotatably supported on a vertical portion of frame element 82. Beyond the sprocket 93, the chain 91 continues horizontally beneath the cradle assembly 79 and between the channel members 5 and 6 of the horizontal track 7 and meshingly engages with the sprocket 94 rotatably supported by a vertically disposed frame element 95 rearwardly of the cradle assembly. The roller chain 91 extends under and around the sprocket 94 with the corresponding end thereof being pivotally connected to an anchor bolt or the like 96 secured to the rearward end of the cradle assembly 79 generally transversely aligned with the rollers 21 movable in the horizontal track 7.

In operation, the hydraulic ram means or cylinder-piston assemblies 80 and 81 are alternately extended in relation to each other to selectively orient the load 1. With the cradle assembly 79 disposed horizontally as generally shown in FIG. 11, the cylinder-piston assembly 80 is contracted while the cylinder-piston assembly 81 is extended. Conversely, with the cradle assembly 79 disposed vertically as generally shown in FIG. 12, the cylinder-piston assembly 81 is contracted while the cylinder-piston assembly 80 is extended.

According to FIG. 13, the diagrammatically shown hydraulic ram means or cylinder-piston assemblies 80 and 81 are generally in the condition shown in FIG. 11 wherein the assembly 80 is shown contracted and the assembly 81 extended to place the cradle assembly 79 in the horizontal mode. The single acting assemblies 80 and 81 are selectively actuated by fluid under pressure as supplied by the motor-pump 97 which draws the fluid from the sump or reservoir 98 through the supply line 99. The pressure line 100 from the pump 97 as well as the return 101 to the sump or reservoir 98 are connected to a three-position valve unit 102 which is diagrammatically shown in the intermediate or locking position in FIG. 13. The valve unit 102 communicates with assembly 80 through the line 103 which is interrupted by the parallel or branch lines 104 and 105. Valve unit 102 also communicates with the assembly 81 through the line 106 which is interrupted by the parallel or branch lines 107 and 108.

Fluid flow to extend the cylinder-piston assembly 80 is precluded in the branch line 105 by the one-way check and regulating valve 109 so that the flow to extend the assembly 80 must pass through the branch line 104 past the relatively low pressure check valve 110. Flow out of the assembly 80 is precluded in the branch line 104 by the one-way check valve 110 to force the out flow through the branch line 105 past the check valve 109.

Fluid flow to and from the cylinder-piston assembly 81 is similarly controlled as for the assembly 80. For extension of assembly 81 flow is precluded in the branch line 108 by the one-way check and regulating valve 111 so that the flow to extend the assembly 81 must pass through the branch line 107 past the relatively low pressure check valve 112. During contraction of assembly 81, out flow is precluded through branch line 107 by the one-way check valve 112 to force the out flow through the branch line 108 past the check valve 111.

When it is desired to upend the load 1 from the position shown in phantom in FIG. 11 to the position of FIG. 12, it is necessary to effect an extension of the cylinder-piston assembly 80. To effect the desired extension of assembly 80, the motor-pump 97 is started and the solenoid 113 is simultaneously energized to set the through passage portion 114 of valve unit 102 into position placing the pressure line 100 in communication with line 103 and the return line 101 in communication with the line 106. With valve unit 102 so set, fluid under pressure from the pump 97 passes through line 103 including branch line 105 to extend the assembly 80. As the rods 84 and 85 move out upon extension of assembly 80, the roller chain 87 is forced to lift the forward end of the cradle assembly 79 with the rollers 31 being guided in the channels 10 and 11 of vertical track 12. As the forward end of the cradle assembly 79 is being lifted, the rearward end of the cradle assembly follows along in the horizontal track 7 pulling the corresponding end of the roller chain 91 with it. As the roller chain 91 is pulled along at the rearward end of the cradle assembly 79, the chain 91 forces the single acting cylinder-piston assembly 81 to contract to thereby push the fluid out of the assembly 81 through the line 106 including the branch line 108 and back to the sump 98 through the return line 101 aligned with line 106 through the valve portion 114. The valve 111 in branch line 108 is set to impose sufficient resistance upon the fluid being forced out of the assembly 81 during its contraction to maintain the roller chain 91 taut throughout the upending procedure and particularly when the center of gravity of the load shifts from a position ahead to a position rearwardly of rollers 21 and thereafter as the cradle assembly 79 approaches the vertical position to assure full control and gentle handling of the assembly 79 and its load during the procedure. At the conclusion of the upending procedure, a suitable micro-switch, not shown, may be utilized to stop the motor-pump 97 and to deenergize the solenoid 113 so that the valve unit 102 can automatically return to its intermediate or locking position.

To effect downending of the cradle assembly 79 from the postion shown in FIG. 12 to the position of FIG. 11, the cylinder-piston assembly 81 is extended. To extend the assembly 81, the motor-pump 97 is started and the solenoid 115 is simultaneously energized to set the cross passage portion 116 of valve unit 102 into position placing the pressure line 100 in communication with line 106 and the return line 101 in communication with the line 103. With the alignment of valve unit 102 as described, fluid from the pump 97 is caused to flow through line 106 including branch line 107 to extend the assembly 81. As the assembly 81 is extended and the rods 84 and 85 move out correspondingly, the roller chain 91 is forced to pull the rear end of the cradle assembly 79 in a rearward direction relative to the horizontal track 7. As the rear end of the cradle assembly 79 moves rearwardly in response to the pull of chain 91, the forward end of the cradle assembly is forced to move downwardly relative to the vertical track 12 and pulls the roller chain 87 with it to contract the single-acting cylinder-piston assembly 80 and thereby push the fluid out of the assembly 80 through the line 103 including branch line 105 for return to the sump 98 via the return line 101 aligned with the line 103 through the cross passage portion 116 of valve unit 102. The valve 109 in branch line 105 like its counterpart valve 111 relative to cylinder-piston assembly 81, is set to impose a sufficient resistance upon the fluid being forced out of the assembly 80 during its contraction to maintain the roller chain 87 taut throughout the downending procedure to assure the desired full control and gentle handling of the cradle assembly 79 and its load. At the conclusion of the downending procedure, a suitable micro-switch, not shown, may be used to stop operation of the motor-pump 97 and to deenergize the solenoid 115 to allow the valve unit 102 to again automatically return to its intermediate or locking position.

The control mechanism as diagrammatically shown in FIG. 13 can be mounted within the casing 83 to provide a generally self-contained upender apparatus. If desired, the upender apparatus can be provided with suitable casters, not shown, to render the apparatus portable among spaced work sites.

Since the materials handling apparatus of this invention can be made available at a relatively modest price, large scale operation is not a prerequisite for puschase. In addition to a modest price, the ease of operation and relief from manual lifting should make the apparatus attractive to smaller scale operations. While the nature of certain materials may require tie-down during upending or downending operations, the fact that potentially damaging clamping is unnecessary for the apparatus of this invention should also provide attractive.

Various modes of carrying out the invention are contemplated as being within the scope of the following claims particularly pointing out and distinctly claiming the subject matter which is regarded as the invention.

I claim:

1. In a materials handling apparatus for orienting a load between the horizontal and vertical positions, a generally L-shaped frame having a horizontal and vertical leg, a first track provided on the horizontal leg of said frame, a second track provided on the vertical leg of said frame, a movable generally L-shaped load carrying member having first and second load supporting surfaces disposed generally normal to each other and corresponding to the horizontal and vertical positions for a given load, one of said load supporting surfaces comprising a transversely extending plate member and the other load supporting surface comprising transversely spaced and aligned arms, first carriage means at one end of the first load supporting surface of the load carrying member and guided by the horizontal track, second carriage means at the opposite end of the first load supporting surface of the load carrying member and guided by the vertical track, and means for driving the respective carriage means along the corresponding tracks to move the load carrying member to provide for the desired orientation for a load from the one load supporting surface to the other load supporting surface of said member.

2. The invention as set forth in claim 1 wherein a ramp is provided along at least one longitudinal edge of the transversely extending plate to provide for greater ease of loading and unloading the load carrying member.

3. The invention as set forth in claim 2 wherein the ramp is formed integrally with the transversely extending plate.

4. In a materials handling apparatus for orienting load between vertical and horizontal positions, a frame, a generally horizontal track and generally vertical track provided on the frame and disposed generally normal to each other, a generally L-shaped load carrying member having first and second load supporting surfaces disposed generally normal to each other means at one end of the first load supporting surface of the load carrying member and guided by the horizontal track, means at the other end of the first load supporting surface of the load carrying member and guided by the vertical track, a pair of elongate flexible members having one end thereof anchored to the frame and the respective opposite ends thereof connected to the load carrying member at corresponding ends of the first load supporting surface, and an hydraulic cylinder-piston assembly engageable intermediate the length of each said flexible member and being selectively operable to displace at least some portion of the length of the corresponding flexible member to drive the load carrying member relative to the corresponding track, said cylinder-piston assemblies being adapted to work in opposition to each other with one of the cylinder-piston assemblies being extendible to drive the corresponding end of the load carrying member through the corresponding flexible member to provide the desired orientation of the load carrying member while the other of the cylinder-piston assemblies is caused to contract by the other flexible member and is adapted to brake the opposite end of the load carrying member whereby to maintain full control of the load carrying member during orienting movement thereof.

5. In a materials handling apparatus for orienting a load between vertical and horizontal positions, a frame, a generally horizontal track and a generally vertical track provided on the frame and disposed generally normal to each other, a generally L-shaped load carrying member having first and second load supporting surfaces disposed generally normal to each other, means at one end of the first load supporting surface of the load carrying member and guided by the horizontal track, means at the other end of the first load supporting surface of the load carrying member and guided by the vertical track, a pair of lengths of roller chain having one end thereof anchored to the frame and the respective opposite ends thereof connected to the load carrying member at corresponding ends of the first load supporting surface, and a single-acting cylinder-piston assembly corresponding to each said length of roller chain, said cylinder-piston assemblies having sprockets engageable with the corresponding roller chain and being adapted to work in opposition to each other with one of the cylinder-piston assemblies being extendible to drive the corresponding end of the load carrying member to provide the desired orientation of the load carrying member while the other of the cylinder-piston assemblies is caused to contract by the other length of roller chain and is adapted to brake the opposite end of the load carrying member whereby to maintain full control of the load carrying member during orienting movements thereof.

* * * * *